United States Patent [19]

Erdelyi

[11] 4,061,889

[45] Dec. 6, 1977

[54] FILM WITH LIGHT SOUND TRACK CARRYING THE STEREOPHONIC SOUND INFORMATION; RIBBON LIGHT VALVE FOR PROVIDING THE LIGHT SOUND TRACK AS WELL AS LIGHT SOUND ADAPTER FOR REPRODUCING THE INFORMATION RECORDED ON LIGHT SOUND TRACK

[76] Inventor: Gabor Erdelyi, Lumumba Street 174, Budapest XIV, Hungary

[21] Appl. No.: 624,165

[22] Filed: Oct. 20, 1975

Related U.S. Application Data

[63] Continuation of Ser. No. 404,713, Oct. 9, 1973, abandoned.

[51] Int. Cl.$^2$ .............................................. G11B 7/20
[52] U.S. Cl. .................. 179/100.3 T; 179/100.1 TD; 179/100.3 B; 179/100.3 C; 179/100.3 E
[58] Field of Search .................. 179/100.3 B, 100.3 C, 179/100.3 E, 100.3 T, 100.31, 100.1 TD, 100.4 ST; 250/208, 209, 211 R

[56] References Cited

U.S. PATENT DOCUMENTS

| | | | |
|---|---|---|---|
| 1,922,821 | 8/1933 | Pulvermacher | 179/100.3 V |
| 2,089,484 | 8/1937 | Kleber | 179/100.3 C |
| 2,093,540 | 9/1937 | Blumlein | 179/100.4 ST |
| 2,108,815 | 2/1938 | Gille et al. | 179/100.3 C |
| 2,118,622 | 5/1938 | Sachtleben | 179/100.3 B |
| 2,124,030 | 7/1938 | Douden | 179/100.3 T |
| 2,269,638 | 1/1942 | Scoville | 179/100.3 C |
| 2,295,536 | 9/1942 | Albersheim | 179/100.3 B |
| 2,518,743 | 8/1950 | Bach | 179/100.3 B |

*Primary Examiner*—Raymond F. Cardillo, Jr.

[57] ABSTRACT

A film with a light-sound track carrying stereophonic sound information and a ribbon light valve for producing the light-sound track, and a light-sound transducer for reproducing the information recorded on the light-sound track. On the film, the sounds of two stereophonic channels are recorded in a single light-sound track in the form of an envelope asymmetric to the longitudinal axis of the light-sound track. The ribbon light valve has a light gate controllable by a ribbon arranged in a magnetic field; to the terminals of the two series-connected ribbons a transformer is connected. To the terminals connected with the transformer, two series-connected resistances are connected and, between the junction of the two resistances and the junction of the two ribbons, a further transformer is connected. The light-sound transducer has two light sensing elements, and electric terminals for tapping separately the signals of the two light sensing elements. On the light-sound track, the stereophonic sound of a compatible recording system can be recorded and the film can be projected with a monosound projecting apparatus.

3 Claims, 5 Drawing Figures

FILM WITH LIGHT SOUND TRACK CARRYING THE STEREOPHONIC SOUND INFORMATION; RIBBON LIGHT VALVE FOR PROVIDING THE LIGHT SOUND TRACK AS WELL AS LIGHT SOUND ADAPTER FOR REPRODUCING THE INFORMATION RECORDED ON LIGHT SOUND TRACK

This application is a continuation of application Ser. No. 404,713 filed Oct. 9, 1973 and now abandoned.

FIELD OF THE INVENTION

This invention relates to films with light-sound tracks carrying stereophonic sound information, to ribbon light valves for producing light-sound tracks and to light-sound transducers for reproducing information recorded on light-sound tracks.

BACKGROUND

Monosound pictures are known, the sound information of which is recorded by light modulation on a light-sound track. Three kinds of modulation methods are known, two of which are presently being used. These are longitudinal and the double transversal modulation methods. The other light-sound track modulation method is seldom used.

Sound curves produced with the known methods of modulation always display a regular shape. The sound curve of the double transversal method has a variable width axially symmetrical to a straight line parallel to the associated light-sound track, whereas the longitudinal sound track is a transparent band of constant width and transversely variable position. The envelope of the sound curve has in both cases an axis of symmetry parallel to the light-sound track.

It is a well-known fact that stereophonic sound can be recorded on a light-sound track with a separate light-sound track for each channel. Such film is, however, not produced due to its large space requirement and due to its need for special cameras and projection apparatus.

The drawback of the known solutions is that only the sound information of one channel can be recorded in one light-sound track, and more light-sound tracks cannot be generally arranged on the film due to space requirements. The conventional development of sound curves for light-sound tracks is thus not suitable for providing stereophonic transmission with usual film dimensions.

Stereophonic sound pictures are known, the multi-channel (4 – 6 channels) sound information of which is recorded on a magnetic layer on a film. In the practice, four or more sound channels are always developed. These films with magnetic bands cannot, however, be used in conventional movies. They can only be used in cinema houses provided with magnetic transducers prepared especially for this purpose. Further, experience gained in recent years shows that sound play-back from magnetic sound tracks proved satisfactory only with the so-called six-channel TODAO system employing 70-mm film.

The drawbacks of sound recording on magnetic bands are as follows:
 the magnetic band is susceptible to injury, whereby a falling off in quality of recording quickly occurs,
 the magnetic band, due to its susceptibility to injury, cannot be projected with a conventional projector; in order to prevent threading into conventional apparatus, sprocket holes of different dimensions than those with monosound pictures are used,
 the cinemascope film material is produced only to order, being thus more expensive than conventional film,
 the positive film material must be treated in a different manner,
 traditional apparatus cannot be used for the shooting, copying and play-back of films provided with magnetic bands, whereby the costs of film production and projection are increased and the propagation of stereophonic films is prevented,
 it is very expensive,
 since stereophonic sound pictures not wide-spread, equipment of cinemas provided with stereophonic apparatus is not fully utilized.

The compatible recording system operating with the so-called sum and difference technique used with gramaphone recording and megnetophone recording is also well-known. It provides a recording which can be played back both on monosound reproducing devices and stereophonic sound reproducing devices, being thus a compatible sound-recording method.

The recording correction of multi-channel stereophonic sound used in film production is more difficult than the electronic correction method used with recordings of the compatible recording system and stereophonic film cannot be played back on monosound apparatus.

The so-called changeable unit of film-producing apparatus (light-sound camera) is a ribbon light valve whereby the sound curve of a light-sound track is exposed onto a film.

The aperture of known ribbon light valves can be varied by means of two series-connected (electrically) ribbons, arranged in a magnetic field and varying their distance under the effect of the current flowing through them. The current flowing in the ribbons is supplied by an input transformer connected to the poles of the two series-connected ribbons. The known ribbon valves are suitable only for the production of monosound films.

Another changeable unit for film projectors is the push-pull light-sound transducer for sensing information of light-sound tracks. This unit consists of two light-sensing elements series-connected to each other, arranged behind the optics and aperture of the unit. The common point of the series-connected elements is not used for signal generating purposes. Only the outlets giving the sum of the output signals of the two sensing elements are used for this purpose. These known ribbon light valves are suitable for monosound reproduction for films according to the invention, but cannot be used for stereophonic sound projection.

SUMMARY OF THE INVENTION

An object of the invention is to provide for the elimination of drawbacks of conventional shooting and play-back of known stereophonic sound films.

Another object is to provide for the development of sound recording with small space requirements, and the recording and play-back of which can be carried out by simple processes such as with monofilms and which is suitable for the recording and play-back of stereophonic sound in compatible recording systems.

To achieve the above and other objects, there is provided according to the invention, a stereophonic sound film with stereophonic sound recorded in a light-sound track. The sounds of two stereophonic channels are recorded in a single light-sound track in the form of a sound curve having an envelope asymmetric to the longitudinal axis of the light-sound track. In an asymmetric sound curve of varying width, the information contents of two interdependent stereophonic channels can be recorded.

In a light-sound track of the film according to the invention, stereophonic sounds of a compatible recording system with the so-called sum and difference technique can also be recorded which will be compatible also for film, being thus also suitable for reproduction by means of a monosound projector.

Apparatus according to the invention, also comprises a light exposure valve suitable for the production of stereophonic sound film, the aperture of which can be regulated by means of ribbons arranged in a magnetic field. To the poles of the two series-connected ribbons is connected an input transformer. To the outputs of the two series-connected ribbons connected with the input transformer are connected two series-connected resistances. Between the common point of the two resistances and the common point of the two ribbons, a further input transformer is connected.

The push-pull light adapter provided, according to the invention, with two light sensing elements is characterized in that both poles of both elements are drained. In other words the signal of each light sensing element is separately drained.

The advantages of the film according to the invention are as follows:

- sound recording can be carried out in a manner similar to monosound recording (same sprocket holes; same apparatus provided with the ribbon light valve according to the invention),
- the sound recording has a long life compared to sound recorded on a conventional magnetic band,
- copying is simple and can be accomplished in the same operation as for the picture,
- the space requirement is not more than that for monosound recording,
- the stereophonic sound recording of the compatible recording system can also be played back as monosound by means of monosound apparatus, being thus suitable for projection in all cinemas,
- the production costs are similar to those for monofilm.

The advantages of the ribbon light valve according to the invention are as follows:

- the ribbon light exposure valve construction can be transformed with insignificant expenditure,
- the interference of the two channels is infrequent since the two information signals get to the two diagonals of a bridge circuit; the transformation can be effected without any technical compromise and gives an optimum solution even with respect to its operation in principle,
- it renders possible the fully efficient application of monosound recording apparatus for the production of stereophonic sound film which may result eventually in the superseding of monofilms,
- it is suitable also for the production of monofilm.

The advantages of the push-pull light-sound transducer according to the invention are as follows:

- existing push-pull light-sound transducers can be transformed with insignificant expenditure,
- it renders possible the use of the traditional projecting apparatus for stereophonic sound reproduction.

BRIEF DESCRIPTION OF THE DRAWING

The invention will next be disclosed in greater detail on the basis of the annexed drawing in which.

DETAILED DESCRIPTION

In FIG. 1, the light-sound track sections developed with various modulation methods are to be seen. The hatched parts are covered by ribbons $H_1$ and $H_2$ when recording, these parts being exposed to become dark on the positive film. The transparent field between the two dark fields is the sound curve, one limit of which is constituted by the ribbon $H_1$, the other one by the ribbon $H_2$.

Figure 1A:
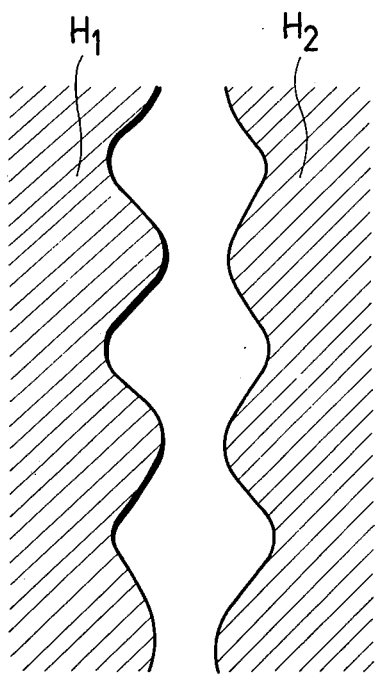
FIG. 1a shows a light-sound track made with double transverse modulation.

The sound curve made with double transverse modulation, shown in FIG. 1a as well as the envelope of the sound curve are symmetrical to the longitudinal centerline. The sound intensity is proportional to the width of the sound curve.

Figure 1B:
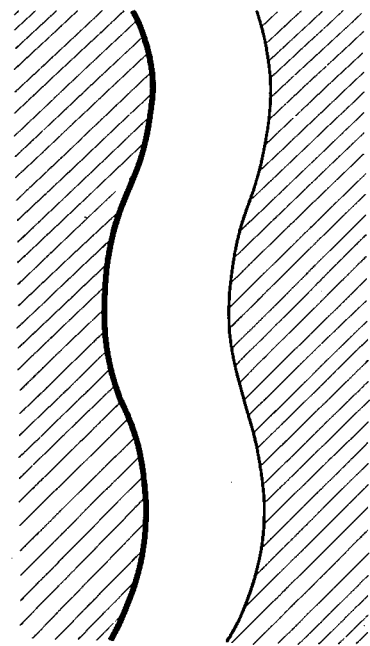
FIG. 1b shows a light-sound track made with longitudinal modulation.
Figure 1C:
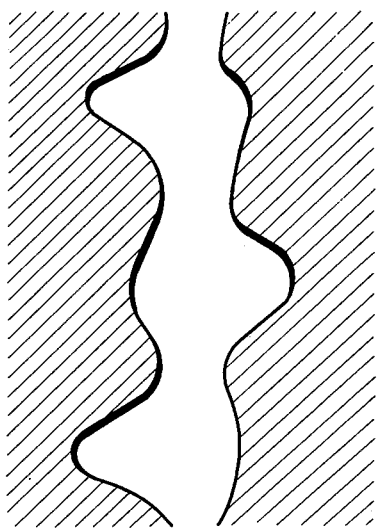
FIG. 1c is a light-sound track for stereophonic sound film.

The longitudinal centerline of the sound curve made with longitudinal modulation and shown in FIG. 1b is a periodic signal, the transverse deviation of which from the centerline is proportional to sound intensity. The width of the sound curve reproduced with this method of modulation is constant.

On the light-sound track of the film according to the invention, the sound curve can be established, for example, by the simultaneous application of the above two methods of modulation so that one of the ribbons $H_1$ is controlled by the sum of the signals of the two stereophonic channels. The other ribbon $H_2$, however, is controlled by the difference of the signals of the two stereophonic channels. A sound track established in this way is to be seen in FIG. 1c. This sound track is not symmetrical and is not of constant width. Its envelope is also not axially symmetrical except in an extreme case when the information of at least one channel is zero, or when in both channels temporarily constant information are present (e.g. $f = 440$ cps, with constant amplitude). If, in one or other channel, no sound signal is present, then the sound curve form obtainable with double transverse and longitudinal modulation, respectively, is regained.

On a film according to the invention, stereophonic sound can be recorded. The form of one boundary of the sound curve changes in accordance with the sum information, whereas the form of its other boundary according to the difference information, that is one ribbon $H_1$ of the ribbon exposure valve is controlled by the sum of the sound informations of the two stereophonic channels, whereas its other ribbon $H_2$ is controlled by the difference of sounds of the two stereophonic channels.

The film according to the invention can be played back with monosound projection apparatus provided with monosound, since the distance (width) between the two boundaries of the sound track is such as if it had been made with double transverse modulation. Thus the width of the sound track is characteristic of the M-information (a sum signal, L + R). The transverse displacement of the centerline of the sound curve of varying width carries the S-information (a difference signal, L − R).

The invention can also be used by means of other apparatus used for monosound film. Only the change and transformation, respectively, of one ribbon changeable unit and thus of the ribbon light valve is required.

Figure 2:
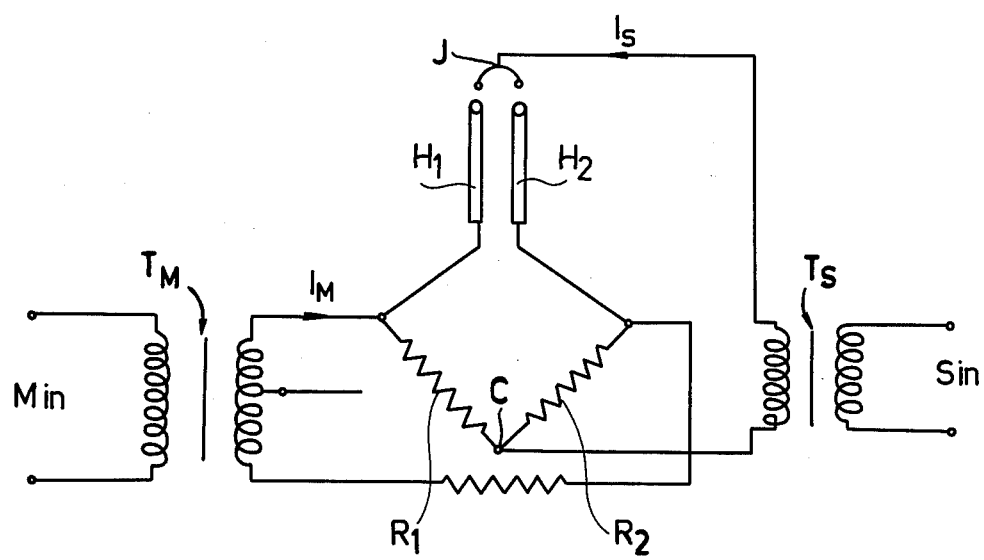
FIG. 2 is an electric schematic diagram of a modulator of the ribbon light valve of this invention.

The stereophonic light-sound track according to the invention can be developed, for example, by the use of the ribbon light valve shown in FIG. 2. The ribbon light valve has a light gate controllable with the ribbons or pickups $H_1$, $H_2$ arranged in a magnetic field. To the terminals of the two series-connected ribbons $H_1$, $H_2$ is connected an input transformer $T_M$ of the two series-connected ribbons, two series-connected resistances $R_1$, $R_2$ are connected. Between the common point C of the two resistances $R_1$, $R_2$ and the common point J of the two ribbons, a further input transformer $T_S$ is connected. Point c and the center top of the transformer Tm may be connected to a common reference potential. The modulating voltages can be applied to the input transformers $T_M$ and $T_S$.

The stereophonic sound projection of the stereophonic sound film according to the invention can be carried out with the traditional monosound projecting apparatus. In this case, the push-pull light-sound transducer, which is built in as a changeable unit, must be replaced.

Figure 3:
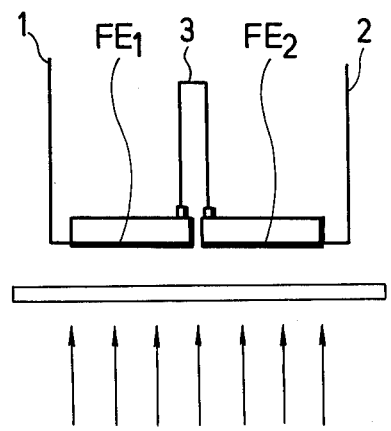
FIG. 3 is an electric schematic diagram of a push-pull light-sound adapter.

The construction of the light-sound transducer according to the invention may be similar to known light-sound transducers developed with two light sensing elements. However, the signal of each element is separately drained (see FIG. 3).

The light beam arriving from the light-sound track of the projected film in the direction of the arrows arrives at the two light sensing elements $FE_1$, $FE_2$ through an aperture. In case of the monosound push-pull light-sound transducer, only the two extreme terminals 1, 2 conducting the sum of signals of the two light sensing elements are utilized. With the solution according to the invention, the junction of two light sensing elements $FE_1$, $FE_2$ is also tapped or drained either separately or in common with the others.

What is claimed is:

1. A film having a light-sound track carrying first and second stereophonic sound information and comprising a film body and along said film body a light sound track carrying stereophonic sound information in a curve with varied width, said curve having two boundries and a center line the width of the curve modulated transversely by said first stereophonic sound information and the center line of the curve being modulated by said second stereophonic sound information, said boundries varying independently of one another to provide said varied width.

2. A method comprising recording stereophonic sounds, represented by two sound information expressions formed of two sound signals L and R, on a film by forming along said film an asymmetrical light-sound track carrying said two stereophonic sound information expressions in a curve limited by two boundries varying independently of one another to provide a varying width, said curve having a center line, said forming being effected by modulating the boundries of the curve with transverse modulation by one of the expressions of the stereophonic sound and modulating the center line of the curve by the other expression of the stereophonic sound, the one information expression of the stereophonic signals being taken from the sum signal L + R and the other information expression being taken from the difference signal L − R.

3. A light exposure valve apparatus for the production of a light-sound curve in a light-sound track, a stereophonic signal being recorded on a film by forming along said film a light-sound track carrying two stereophonic sound information expressions in a curve limited by two boundries varying independently of one another to provide a varying width, said curve having a center line the width of the curve being modulated with transverse modulation by one of the expressions of the stereophonic sound and the center line of the curve being longitudinally modulated by the other expression of the stereophonic sound, said apparatus comprising a light gate, series-connected ribbons for controlling said gate, means by which said ribbons are arranged in a magnetic field, said ribbons having a common junction and respective terminals, a first transformer connected to said terminals, two series-connected resistances connected between said terminals and having a common junction, a further transformer connected between the junction of said ribbons and the junction of said resistances, means for feeding an electrical signal representing one of said expressions to said first transformer, and means for feeding an electrical signal representing the other of said expressions to said further transformer.

* * * * *